United States Patent [19]

Snitzer

[11] 3,885,976

[45] May 27, 1975

[54] SOLARIZATION RESISTANT GLASS CONTAINING YTTERBIUM OXIDE

[75] Inventor: Elias Snitzer, Wellesley, Mass.

[73] Assignee: American Optical Corporation, Southbridge, Mass.

[22] Filed: May 8, 1972

[21] Appl. No.: 251,730

Related U.S. Application Data

[63] Continuation-in-part of Ser. No. 55,265, July 15, 1970, abandoned, which is a continuation-in-part of Ser. No. 820,011, April 28, 1969, abandoned, which is a continuation-in-part of Ser. No. 523,565, Jan. 28, 1966, abandoned.

[52] U.S. Cl.................... 106/52; 106/47 R; 106/53; 106/54
[51] Int. Cl............................ C03c 3/04; C03c 3/30
[58] Field of Search............... 252/301.4 F, 301.6 F; 106/47 R, 52, 54, 53

[56] References Cited
UNITED STATES PATENTS 3,208,009 9/1965 Etzel................................. 106/52 X
3,663,474 5/1972 Lee et al........................... 106/52 X

OTHER PUBLICATIONS

Gandy et al., "Proceedings of the Institute of Radio Engineers," Vol. 50, pages 2114–2115, (1962).

Snitzer, "The Glass Industry," pages 498–503, (1967).

Primary Examiner—Jack Cooper
Attorney, Agent, or Firm—Andrew E. Pierce; William C. Nealon; H. R. Berkenstock, Jr.

[57] ABSTRACT

A glass composition for providing a substantially colorless glass which, even when subjected to large amounts of optical radiation within the 220 m$\mu$ to near infra-red region of the spectrum, will remain unchanged, said composition including ytterbium oxide and a selected transition metal ion in suitable amounts as the non-solarization and the non-fluorescent ingredients therein.

4 Claims, No Drawings

SOLARIZATION RESISTANT GLASS CONTAINING YTTERBIUM OXIDE

CROSS-REFERENCES TO RELATED APPLICATIONS

This application is a continuation-in-part of my copending application Ser. No. 55,265, filed July 15, 1970, now abandoned, which was a continuation-in-part of application Ser. No. 820,011, filed Apr. 28, 1969, now abandoned, which was a continuation-in-part of my application Ser. No. 523,565, filed Jan. 28, 1966, and now also abandoned.

BACKGROUND OF THE INVENTION

This invention relates generally to substantially colorless glass materials, and more particularly to means in combination with said glass materials for preventing solarization and fluorescence in the glass materials even when used to transmit high intensity optical radiation within the region from 220 m$\mu$ to the near infrared of the optical spectrum.

Many glass compositions are known and used which comprise non-solarizing ingredients such as cerium, titanium or antimony to prevent the coloring or reduction in transmission capability of the glass at particular wavelengths. These non-solarizing materials are particularly useful in space applications where there is a solarization problem due to the presence of ultra-violet energy. However, commonly used non-solarizing agents universally exhibit significant absorption and/or cut-off below about 400 m$\mu$.

The phenomenon of solarization in a glass material is characterized by its increase in absorbence, which is caused by the formation of color centers consisting of displaced electrons or holes that are trapped in regions of positive or negative charge, respectively (F-centers and V-centers, respectively, in solid state terms). Solarization is usually caused by high intensity ultra-violet light and anti-solarizing agents are included to provide a cut-off of ultra-violet light or, if ultra-violet is admitted, to trap out free electrons or holes which would otherwise produce color centers and, therefore, solarization.

Further explanation of the solarization and anti-solarization phenomena is provided in the Journal of Chemistry and Physics, Vol. 43, page 2442, (1965) by J. S. Stroud and in American Optical Company copending U.S. Patent Application Ser. No. 595,893, filed Nov. 1, 1965, by William H. Shiner for "Laser Apparatus and Glass Composition," now U.S. Pat. No. 3,473,144.

SUMMARY OF THE INVENTION

Accordingly, a primary object of the present invention is to provide a non-solarizing and non-fluorescing glass composition. Such a glass would be useful in any environment wherein there is exposure to ultra-violet or other solarizing radiation such as optical elements for space applications and optical elements in instrumentation involving the transmission of ultra-violet light, especially when high intensities are involved.

This and other objects are accomplished in one illustrative embodiment of the invention wherein any of the commonly used glass bases is provided with ytterbium oxide in the range of 0.10 to 35 weight percentage and a transition metal ion selected from the group consisting of $Ni^{2+}$, $Co^{2+}$, $Cu^{2+}$, $Fe^{2+}$, and $V^{3+}$ in the amount of from 0.01 to 5 weight percent.

Other objects, advantages, features, and embodiments of the invention will be apparent from the following more detailed description of the invention.

DETAILED DESCRIPTION OF THE PREFERRED EMBODIMENTS

Various glass compositions have been studied, which contain ytterbium, or neodymium and ytterbium in combination with selected transition metal ions. The presence of neodymium gives the characteristic purple color to the glass, but if the neodymium is not present, and the only rare earth in the glass is ytterbium, the glass is colorless. The colorless characteristic is due to ytterbium having an absorption band at 1 micron and no other absorption bands until well into the ultra-violet region of the wavelength spectrum. The mechanisms by which the anti-solarization by ytterbium takes place is either due to the absorption band in the ultra-violet absorbing those wavelengths, which if absorbed by the glass base would produce the color centers that are responsible for the darkening of the glass; or another possible mechanism could be the tendency for ytterbium to trap free electrons which would otherwise migrate to sites which would be effective in producing color centers. This latter process is significant when cerium is present in a glass as may be understood by reference to the Stroud article, previously cited.

Additionally, it has been found desirable to provide in such a non-solarization glass composition an ingredient or ingredients which will tend to prevent fluorescense and such can be accomplished by the use of transition metal ions selected from the group consisting of $Ni^{2+}$, $Co^{2+}$, $Cu^{2+}$, $Fe^{2+}$, and $V^{3+}$ and combinations thereof used in the batch in oxide form (TMO) in an amount ranging from 0.01 to 5 weight percent in oxide form. These transition metal ions are characterized by each possessing a partially filled inner electron shell.

These ions are not only capable of quenching the fluorescence of $Yb^{3+}$, they also provide some absorption in one or more selected wavelength regions in the visible, near ultra-violet or near infra-red regions of the spectrum. The particular ions to be used in combination with $Yb^{3+}$ to simultaneously prevent solarization and the optimum concentration for this ion, prevent fluorescence of $Yb^{3+}$, and to obtain a glass transparent in appropriate selected wavelength regions depends upon the application for which the glass is to be used.

One specific glass composition that is useful according to the present invention contains the following weight percentages:

| | |
|---|---|
| $SiO_2$ | 64.85 |
| $Li_2O$ | 1.03 |
| $Na_2O$ | 7.38 |
| $K_2O$ | 11.18 |
| BaO | 4.92 |
| $Al_2O_3$ | 1.54 |
| $Yb_2O_3$ | 9.00 |
| TMO | 0.10 | and wherein TMO consists essentially of CuO.
Another useful composition is the following:

| | |
|---|---|
| $SiO_2$ | 68.95 |
| $Li_2O$ | 1.03 |
| $Na_2O$ | 7.38 |

-Continued

| | |
|---|---|
| K₂O | 11.18 |
| BaO | 4.92 |
| Al₂O₃ | 1.54 |
| Yb₂O₃ | 4.00 |
| TMO | 1.00 |

The foregoing specific glass compositions are prepared by a standard method using normal ceramic utensils. In that method, to produce a melt of approximately one pound, the various ingredients generally in the form of oxides and carbonates are filled into a crucible at 2600° F over approximately a two hour period. The temperature is then elevated to about 2700° F and held for approximately one hour during which time the melt was stirred to homogenize the melt. The melt temperature is returned to 2600° F and held for approximately 1½ hours after which the melt temperature is lowered to 2500° F and held for one hour prior to casting the resultant glass. The cast glass is annealed at successively lower temperatures of 1100° F, 1075° F, and 1050° F.

Since the above noted glass compositions do not include a fining agent such as cerium or antimony, it may be necessary to extend the period of time at 2700° F to free the resultant glass of bubbles. Furthermore, larger melts also require an extension of the periods in a manner which is well known in the art.

The useful ranges of weight percentages in a silicate base are the following:

| | |
|---|---|
| SiO₂ | 55-72 |
| Li₂O | 0-2 |
| Na₂O | 0-15 |
| K₂O | 0-15 |
| BaO | 3-12 |
| Al₂O₃ | 0-3 |
| Yb₂O₃ | .10-35 |
| TMO | .01-5 |

It is not necessary to use a silicate glass to exhibit non-solarization according to the present invention; all of the known bases with ytterbium included are contemplated to be within the scope of the present invention. These bases include among others silicates, phosphates, borates, germanates, borosilicates, aluminosilicates, lanthanum silicates, lanthanum borates, lanthanum phosphates, lead silicates, lead borates, and lead germanates.

Also, it has been found that the glass compositions including ytterbium in the ranges specified have exhibited substantial transmittance for wavelengths at least as short as 220 mμ.

I claim:

1. A solarization resistant glass composition which consists essentially of the following ranges of weight percentages of constituents:

| | |
|---|---|
| SiO₂ | 55-72 |
| Li₂O | 0-2 |
| Na₂O | 0-15 |
| K₂O | 0-15 |
| BaO | 3-12 |
| Al₂O₃ | 0-3 |
| Yb₂O₃ | .10-35 |
| Transition metal oxide | .01-5 | wherein the metal ion of the transition metal oxide is selected from the group consisting of $Ni^{2+}$, $Co^{2+}$, $Cu^{2+}$, $Fe^{2+}$ and $V^{3+}$.

2. The glass composition according to claim 1 wherein said glass base comprises the following weight percentages of constituents:

| | |
|---|---|
| SiO₂ | 64.85 |
| Li₂O | 1.03 |
| Na₂O | 7.38 |
| K₂O | 11.18 |
| BaO | 4.92 |
| Al₂O₃ | 1.54 |
| Yb₂O₃ | 9.00 |
| Transition metal oxide | 0.10. |

3. The glass composition according to claim 1 wherein said glass base comprises the following weight percentages of constituents:

| | |
|---|---|
| SiO₂ | 68.95 |
| Li₂O | 1.03 |
| Na₂O | 7.38 |
| K₂O | 11.18 |
| BaO | 4.92 |
| Al₂O₃ | 1.54 |
| Yb₂O₃ | 4.00 |
| Transition metal oxide | 1.00. |

4. In a solarization resistant glass composition selected from a group consisting of silicates, phosphates, borates and germanates containing an antisolarization agent, the improvement wherein said antisolarization agent consists of ytterbium oxide in the amount of 0.10 to 35 weight percent of said glass composition and wherein said composition contains as an ingredient to quench the fluorescence of $Yb^{3+}$ ions in the region of 1 micron, an oxide of a transition metal ion in the amount of 0.01 to 5 weight percent of said glass composition selected from the group consisting of $Ni^{2+}$, $Co^{2+}$, $Cu^{2+}$, $Fe^{2+}$ and $V^{3+}$, whereby the glass composition has non-solarization and non-fluorescent properties in the visible and near infra-red regions of the optical wavelength spectrum.

* * * * *